United States Patent
Tsai

(10) Patent No.: US 7,180,261 B1
(45) Date of Patent: Feb. 20, 2007

(54) SELF-SYNCHRONOUS AC SERVO SYSTEM FOR HIGH-SPEED SERIAL COMMUNICATION

(75) Inventor: Ching Hsiung Tsai, Taoyuan Hsien (TW)

(73) Assignee: Delta Electronics Inc., Taoyuan (TW)

( * ) Notice: Subject to any disclaimer, the term of this patent is extended or adjusted under 35 U.S.C. 154(b) by 0 days.

(21) Appl. No.: 11/377,443

(22) Filed: Mar. 17, 2006

(51) Int. Cl.
*G05B 19/408* (2006.01)
*H02P 5/74* (2006.01)
(52) U.S. Cl. ..................... 318/625; 318/112
(58) Field of Classification Search ........ 318/105–113, 318/562, 625, 654
See application file for complete search history.

(56) References Cited

U.S. PATENT DOCUMENTS

| | | | | |
|---|---|---|---|---|
| 5,202,611 | A  * | 4/1993 | Uehara et al. | 318/85 |
| 6,791,294 | B1 * | 9/2004 | Kazama et al. | 318/677 |
| 6,814,546 | B2 * | 11/2004 | Sekiguchi | 417/3 |
| 7,119,505 | B2 * | 10/2006 | Komaki et al. | 318/113 |

* cited by examiner

*Primary Examiner*—Bentsu Ro

(57) ABSTRACT

A self-synchronous AC servo system is used for high-speed serial communication and has multiple axes control. The system includes a computer sending command to master axis drive and slave axis drive through a transmission line. The master axis drive and slave axis drive send interrupt request to the computer through the transmission line after receiving the command. Each drive will judge whether the command is for it self according to the interrupt request and stores a plurality of computer commands in queue. Each drive drives master axis motor or slave axis motor by the queued command synchronously according to a synchronous timing clock.

8 Claims, 5 Drawing Sheets

SELF-SYNCHRONOUS AC SERVO SYSTEM FOR HIGH-SPEED SERIAL COMMUNICATION

BACKGROUND OF THE INVENTION

1. Field of the Invention

The present invention relates to an AC servo system, especially to a self-synchronous AC servo system for high-speed serial communication.

2. Description of Prior Art

The current multiple axes control architecture is centralized control. The multiple axes control architecture with centralized control includes an upper controller to control servo drive for linear/circular multiple axes interpolation by following wiring or high-speed communication.

FIG. 1 shows a schematic diagram of a prior art centralized control system for multiple axes control. The command and I/O 14 control of the multiple axes interpolation for the servo drive 12 is dealt by the upper controller 16. The signal from each axis is connected to the servo drive 12 through conventional wiring. However, the above scheme has following advantages:

1. High cost: The performance of the upper controller 16 is demanding for more axes. The CPU (now shown) of the upper controller 16 is also requested with higher grade.

2. Limited axes number: The axes number of the servo drive 12 is limited by CPU grade and hardware channel number.

3. Complicated wiring: There are complicated wiring of A/D, D/A, command pulse, feedback pulse, digital I/O signals between upper controller 16 and servo drive 12.

4. Insufficient resolution: The command signal is limited by physical signals such as A/D conversion resolution and pulse frequency.

5. Environment interference: The analog signal tends to be interfered in factory environment.

6. Maintenance problem: The wires are more complicated when the axes number of the servo drive 12 is large. The inspection and maintenance are troublesome.

FIG. 2 shows the schematic diagram of a prior art control system for multiple axes control with high speed communication, where the wire between the upper controller 16 and servo drive 12 in FIG. 1 is replaced by a high speed communication network 18. The high speed communication network 18 has simple wiring and can prevent interference and enhance resolution. The servo drive 12 does not have interpolation ability for path commands such that the upper controller 16 needs to send intense interpolation commands (more than 1 KHz) to each axis to achieve path denseness. However, the network is also used for sending feedback position, current and I/O status besides position and speed commands. The data throughput is high when the axes number is high and the status of each axis needs monitoring. The bandwidth of the high speed communication network 18 needs at least 10 MHz, which induces following results.

1. Interference prone: High speed communication is more sensitive to noise and high-standard communication hardware such as optical fiber is needed in factory environment.

2. Insufficient synchronism: The serial command is difficult to transit to each axis in synchronism.

SUMMARY OF THE INVENTION

The present invention is intended to provide self-synchronous AC servo system for high-speed serial communication, such that the high-speed serial communication does not need synchronization protocol. The wiring and the cost can be saved.

Accordingly, the present invention provides a self-synchronous AC servo system for high-speed serial communication, the system used for multiple axes control and comprising: a transmission line; a computer coupled to the transmission line; a master axis drive coupled to the transmission line; a master axis motor coupled to the master axis drive; a plurality of slave axis drives coupled to the transmission line; and a plurality of slave axis motor coupled to the slave axis drives; wherein the computer sends command to the master axis drive and the slave axis drives through the transmission line, the master axis drive and the slave axis drives sending interrupt request to the computer after receiving command from the computer; wherein each drive judging whether or not the command is for itself; the drives storing a plurality of commands from the computer in queue; the drives driving the master axis drive and the slave axis drives in synchronism by the commands stored in queue according to a synchronous timing clock.

Accordingly, the present invention provides a method for operating a self-synchronous AC servo system for high-speed serial communication, the method comprising: a computer sending command to a master axis drive and a plurality of slave axis drives through a transmission line; the master axis drive and the slave axis drives sending interrupt requests to the computer through the transmission line after receiving command; the drive judging whether the command is for itself by the interrupt request;

the drive stores a plurality of commands of computer in queue; and the drive controls the master axis drive and the slave axis drives by the commands stored in queue and according to a synchronous timing clock.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
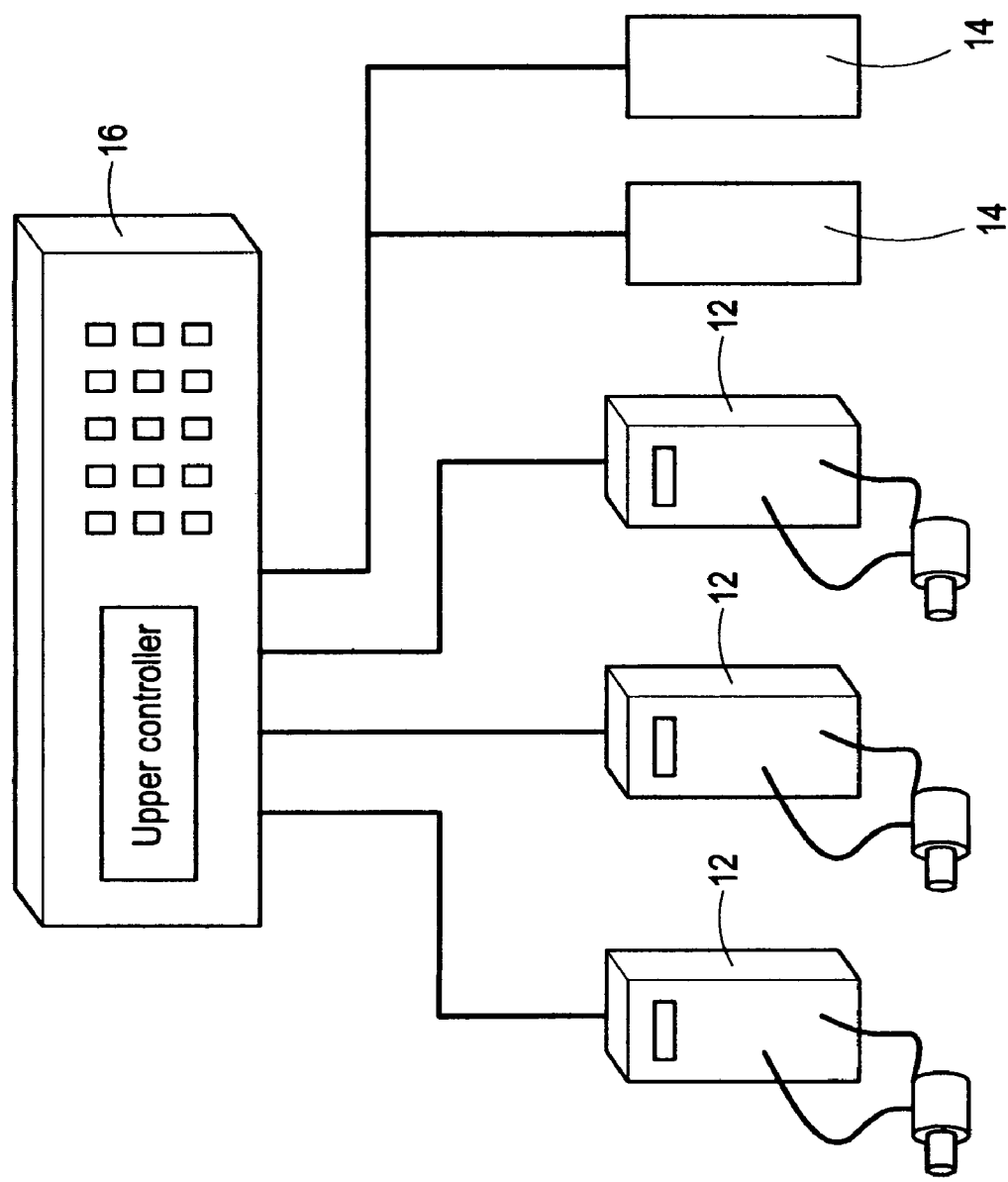
FIG. 1 shows a schematic diagram of a prior art centralized control system for multiple axes control.
Figure 2:
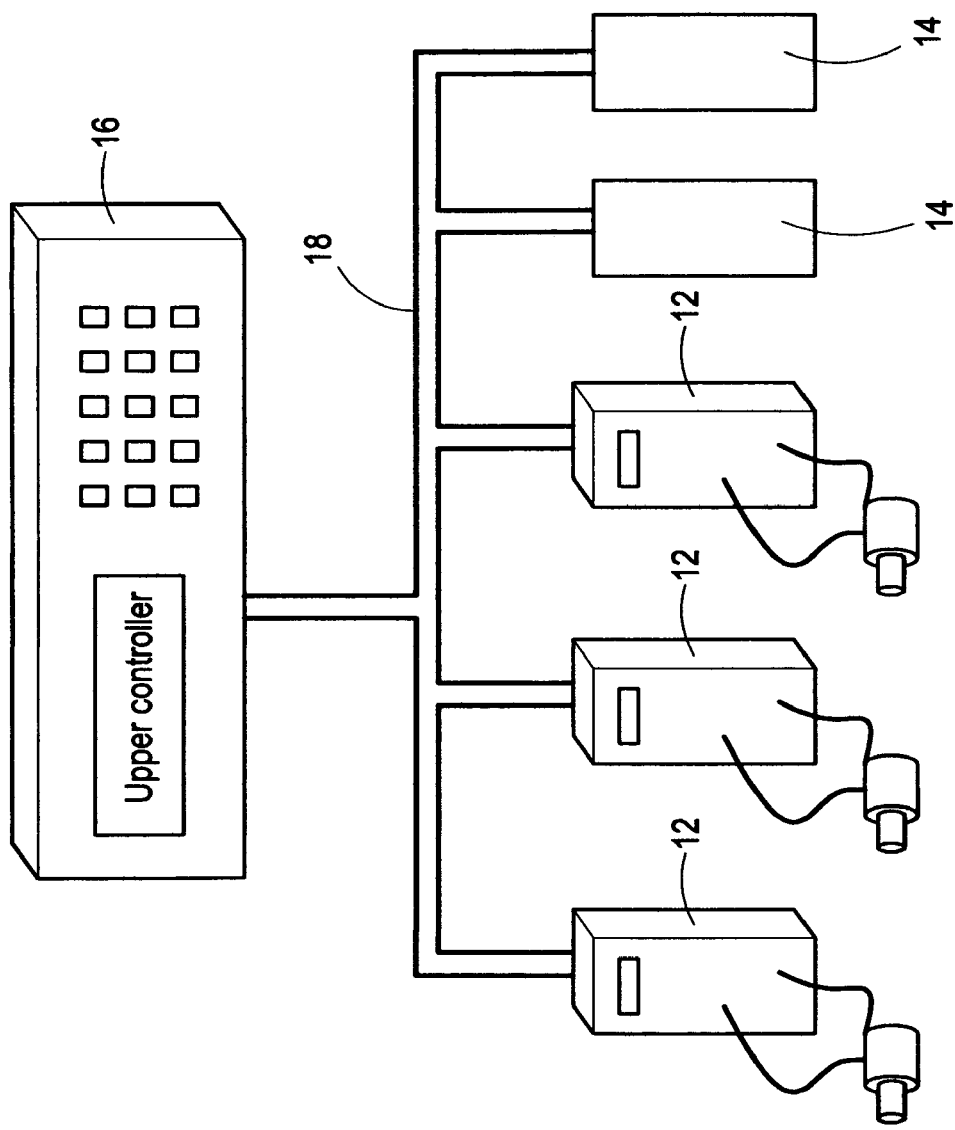
FIG. 2 shows the schematic diagram of a prior art control system for multiple axes control with high speed communication.
Figure 3:
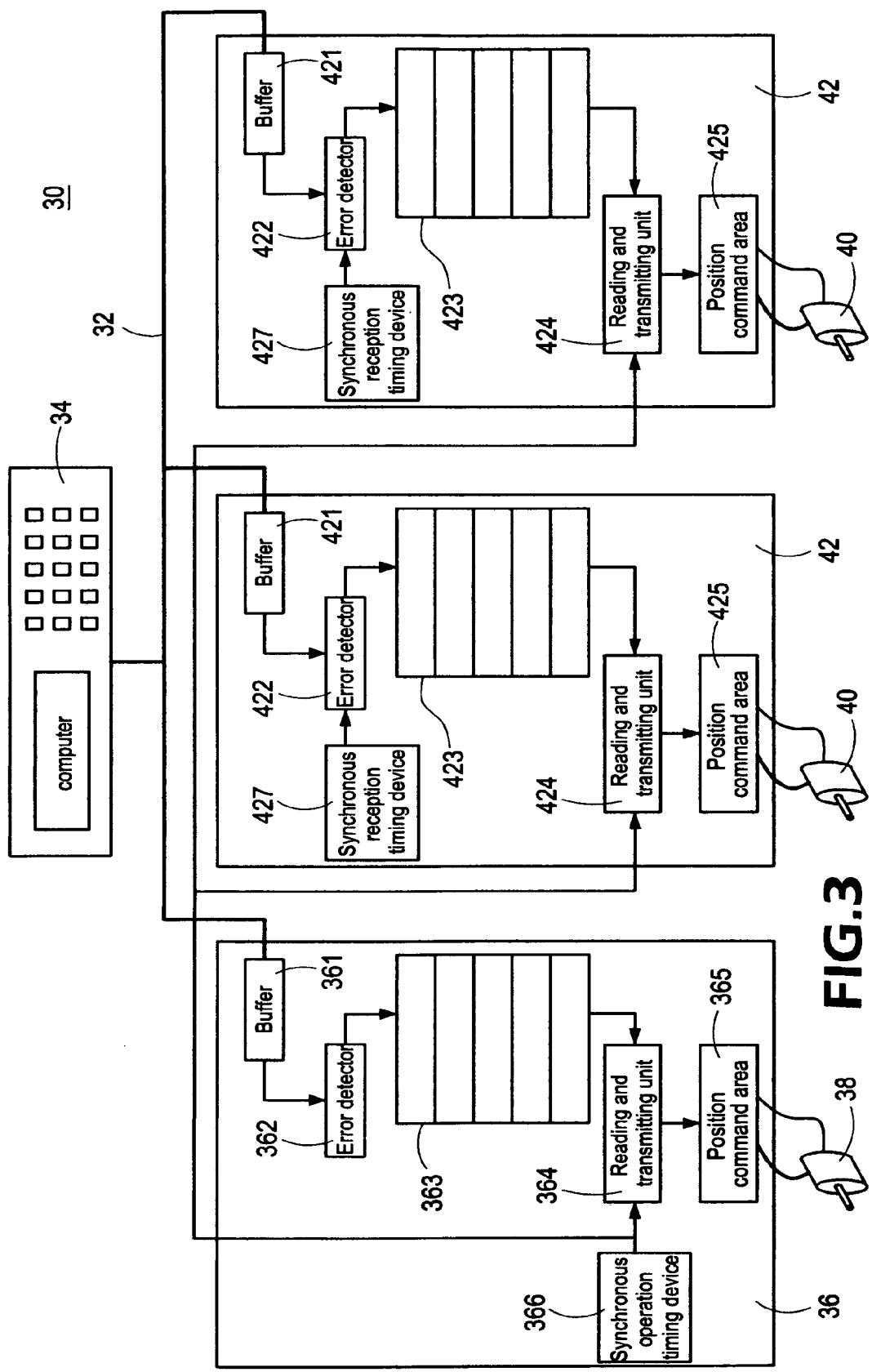
FIG. 3 shows a block diagram of the self-synchronous AC servo system for high-speed serial communication of the present invention.
Figure 4:
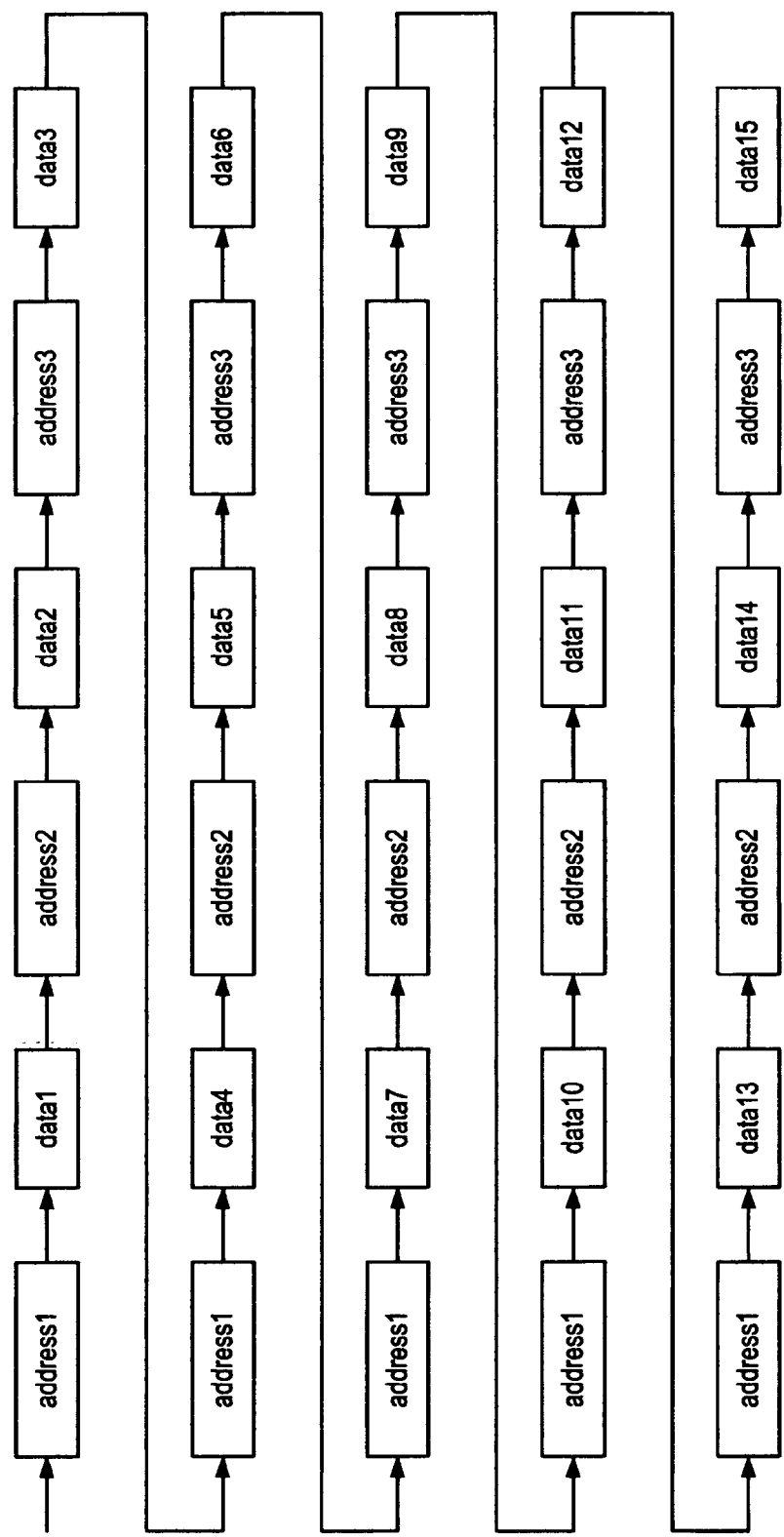
FIG. 4 shows a serial of commands according to the present invention.
Figure 5:
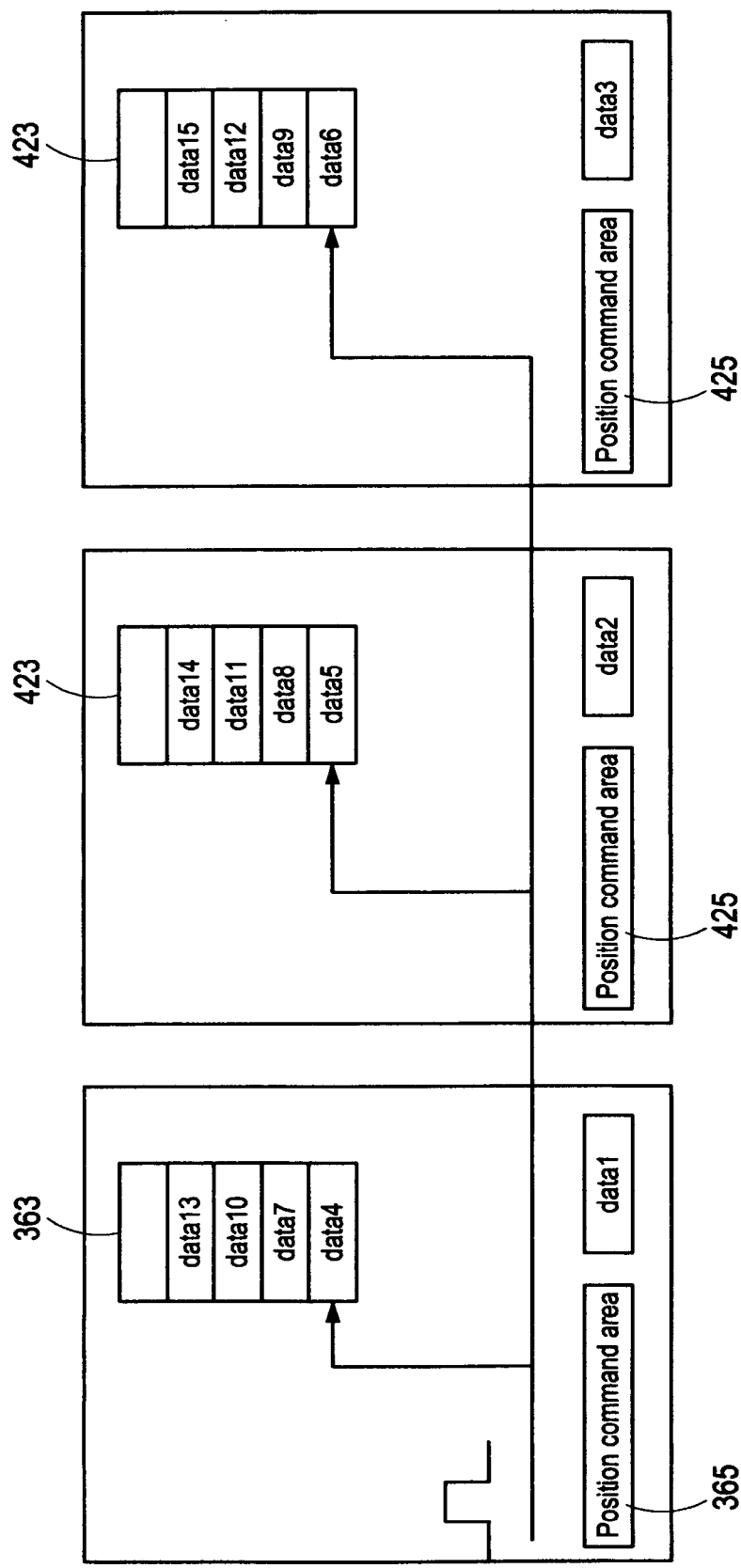
FIG. 5 is schematic diagram showing queued data in axis drive.

FIG. 3 shows a block diagram of the self-synchronous AC servo system for high-speed serial communication of the present invention. FIG. 4 shows a serial of commands according to the present invention. FIG. 5 is schematic diagram showing queued data in axis drive.

As shown in FIG. 3, the self-synchronous AC servo system 30 adopts multiple axes control. The self-synchronous AC servo system 30 comprises a transmission line 32, a computer 34 coupled to the transmission line 32, a master axis drive 36 coupled to the transmission line 32, a master axis motor 38 coupled to the master axis drive 36, a plurality of slave axis drives 42 coupled to the transmission line 32, and a plurality of slave axis motors 40 coupled to the slave axis drives 42. It should be noted that the number of the master axis motor 38 and the slave axis motors 40 is not limited to that shown in FIG. 3. The master axis motor 38 and the slave axis motors 40 are AC servo motors.

The computer 34 issues command to the master axis drive 36 and the slave axis drives 42 through the transmission line 32. As shown in FIG. 4, the first command includes address 1 and data 1; the second command includes address 2 and data 2; the third command includes address 3 and data 3; the forth command includes address 1 and data 4; the fifth command includes address 2 and data 5; the sixth command includes address 3 and data 6 . . . etc., where the addresses 1, 2 and 3 are corresponding to the master axis drive 36 and the slave axis drives 42, 42. The master axis drive 36 and the slave axis drives 42 send interrupt requests to the computer 34 through the transmission line 32 after receiving commands. The master axis drive 36 and the slave axis drives 42 will judge whether the command is for itself by corresponding interrupt request. The master axis drive 36 and the slave axis drives 42 store command of the computer 32 in queues. According to the synchronous timing clocks for the master axis drive 36 and the slave axis drives 42, the master axis drive 36 and the slave axis drives 42 send commands stored in queues to drive the master axis motor 38 and the slave axis motors 40 synchronously.

In FIG. 3, the master axis drive 36 includes a buffer 361 receiving command (in the form shown in FIG. 4) of the computer 34 through the transmission line 32. The command includes address information. In the preferred embodiment, address 1 indicates the master axis drive 36 and the data after the address 1 is the data to be sent to the master axis drive 36 (namely the data 1, data 4 etc. in FIG. 4). An error detector 362 detects whether the data in the command received by the buffer is correct and complete. A queue storage unit 363 stores the data in queue, wherein the data is judged to be correct and complete by the error detector 362. A reading and transmitting unit 364 reads the stored data of the queue storage unit 363 and sends the data to a position command area 365. The reading and transmitting unit 364 reads data in the queue storage unit 363 and sends data to the position command area 365 according to synchronous clocks of the synchronous operation timing device 366, which is synchronous with the reading and transmitting unit 424 of the slave axis drive 42.

As shown in FIG. 5, according to the first period of the synchronous operation timing device 366, the reading and transmitting unit 364 of the master axis drive 36 reads data 1 in the queue storage unit 363 and sends the data 1 to the position command area 365. In the same cycle, the reading and transmitting unit 424, 424 of the first and the second slave axis drive 42 read data 2 and data 3 in the queue storage unit 423 and then send the data 2 and data 3 to the position command area 425, 425 of the second slave axis drive 42. The master axis motor 38 is driven according to the data received by the position command area 365.

The slave axis drive 42 includes a buffer 421 to receive command sent from the computer 34 and having format shown in FIG. 4 through the transmission line 32. The command includes address information. In this preferred embodiment, the addresses 2 and 3 indicate the first and the second slave axis drives 42 and 42. The data after the addresses 2 and 3 indicate the data to be sent to the first and the second slave axis drives 42 and 42 (namely, the data 2, data 3, data 4, data 5, data 6 . . . in FIG. 4). An error detector 422 detects whether the data in the command received by the buffer is correct and complete. The error detector 422 detects data in synchronism with the timing clock provided by the synchronous reception timing unit 427 and in synchronism with the slave axis drive 42.

As shown in FIG. 5, the reading and transmitting unit 424 works according to the timing clock of the synchronous operation timing device 366 of the master axis drive 36 and in synchronism with the reading and transmitting unit 364 of the master axis drive 36. The reading and transmitting unit 424 read the data stored in the queue storage unit 423 and then send the data to the position command area 425. As shown in FIG. 5, according to the first clock of the synchronous operation timing unit 366, the reading and transmitting unit 424, 424 of the first and the second slave axis drive 42, 42 read the data 2 and data 3 in the queue storage unit 423, 423 and then send the data 2 and data 3 to the position command area 425, 425. In the same cycle, the reading and transmitting unit 364 of the master axis drive 36 reads the data 1 in the queue storage unit 363 and then sends the data 1 to the position command area 365. The slave axis motor 42 is driven according to the data received by the position command area 425.

As can be seen from above description, the data in the queue storage unit of each axis drive is triggered according to the timing clock of the synchronous timing unit of the master axis drive to send to each position command area. Therefore, each axis drive can be automatically synchronized without using the synchronous command of the computer. The error tolerance for high-speed serial communication is enhanced by queued data and the automatic synchronism.

The computer 34 sends a series of commands such that each axis drive 36, 42 will inform the computer 34 to stop sending command when the data in the queue storage unit 363, 423 is full. The axis drive 36, 42 will automatically operate the data sent from the queue storage unit 363, 423 according to the timing clock sent from the synchronous operation timing unit 366. When the remaining data in the queue storage unit 363, 423 reaches a predetermined amount, the axis drive 36, 42 will ask the computer 34 to send command until the queue storage unit 363, 423 has full data. When the computer 34 sends command and the queue storage unit 363, 423 still sends data, the frequency of the timing clock of the synchronous operation timing unit 366 is reduced if the remaining data in the queue storage unit 363, 423 reaches a predetermined amount. Therefore, the reading speed and the sending speed of the reading and transmitting unit 364, 424 is reduced. In other word, the axis motor has slow trace, but the path is not changed. Therefore, the problem of stop operation of the axis motor 38, 40 due to over low data rate in the queue storage unit 363, 423 can be solved when the error rate of the high speed serial communicating is high.

To sum up, the present invention has the advantage of error tolerance for high speed serial communication. Each axis drive has individual synchronism such that the high speed serial communication does not need synchronization protocol. The wiring and the cost can be saved.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A self-synchronous AC servo system for high-speed serial communication, the system used for multiple axes control and comprising:
    a transmission line;
    a computer coupled to the transmission line;
    a master axis drive coupled to the transmission line;
    a master axis motor coupled to the master axis drive;
    a plurality of slave axis drives coupled to the transmission line; and
    a plurality of slave axis motor coupled to the slave axis drives;
    wherein the computer sends command to the master axis drive and the slave axis drives through the transmission line, the master axis drive and the slave axis drives sending interrupt request to the computer after receiving command from the computer,
    wherein each drive judging whether or not the command is for itself;
    the drives storing a plurality of commands from the computer in queue;
    the drives driving the master axis motor and the slave axis motors in synchronism by the commands stored in queue according to a synchronous timing clock.

2. The system as in claim 1, wherein
    the master axis drive comprises:
    a buffer receiving command from the computer through the transmission line;
    means for detecting error, which detects whether the data received by the buffer is correct and complete;
    means for queuing, which stores the data judged to be correct and complete by the means for detecting error in queue;
    means for reading and transmitting, which reads the data stored in queue by the means for queuing and then transmitting the data;
    means for synchronous operation timing clock, which generates a synchronous operation timing clock, wherein the means for reading and transmitting transmits the data according to the synchronous operation timing clock; and
    a position command area, wherein the means for reading and transmitting transmits data to the position command area and the position command area drives the master axis motor according to the data of the position command area;
    the slave axis drive comprising:
    the buffer receiving command from the computer through the transmission line;
    the means for detecting error, which detects whether the data received by the buffer is correct and complete;
    means for synchronous reception timing clock, which generates a synchronous reception timing clock, wherein the means for detecting error detects the data according to the synchronous reception timing clock;
    the means for queuing, which stores the data judged to be correct and complete by the means for detecting error in queue;
    the means for reading and transmitting, which reads the data stored in queue by the means for queuing according to the synchronous operation timing clock and then transmitting the data;
    the position command area, wherein the means for reading and transmitting transmits data to the position command area and the position command area drives the slave axis motor according to the data of the position command area.

3. The system as in claim 1, wherein the computer sends a serial of command to fill the means for queuing; the drive informing the computer to stop sending command when the means for queuing is full; the drive asks the computer to resend command when a remaining data amount in the means for queuing reaches a predetermined amount; the means for synchronous operation timing clock slows the synchronous operation timing clock when a remaining data amount in the means for queuing reaches a predetermined minimum, whereby operation speed of the means for reading and transmitting is slower.

4. The system as in claim 1, wherein the master axis motor and the slave axis motor are AC servo motors.

5. A method for operating a self-synchronous AC servo system for high-speed serial communication, comprising:
    a computer sending command to a master axis drive and a plurality of slave axis drives through a transmission line;
    the master axis drive and the slave axis drives sending interrupt requests to the computer through the transmission line after receiving command;
    the drive judging whether the command is for itself by the interrupt request;
    the drive stores a plurality of commands of computer in queue; and
    the drive controls the master axis motor and the slave axis motors by the commands stored in queue and according to a synchronous timing clock.

6. The method as in claim 5, further comprising
    a buffer of the master axis drive and a buffer of the slave axis drive receiving command of the computer through the transmission line;
    using means for detecting error of the master axis drive to detect whether the data received by the buffer is correct and complete;
    according to a synchronous reception clock, using means for detecting error of the slave axis drive to detect whether the data received by the buffer of the slave axis drive is correct and complete;
    using means for queuing of the master axis drive and the slave axis drive to store the data judged to be correct and complete by the means for detecting error in queue
    according to the synchronous reception clock, using means for reading and transmitting of the master axis drive and the slave axis drive to read the data stored in queue by the means for queuing and then transmit the data to position command area of the master axis drive and the slave axis drive; and
    driving the master axis motor and the slave axis motor according to the data sent to the position command area of the master axis drive and the slave axis drive.

7. The method as in claim 5, further comprising:
    the computer sending a serial of command to fill the means for queuing; the drive informing the computer to stop sending command when the means for queuing is full;
    the drive asking the computer to resend command when a remaining data amount in the means for queuing reaches a predetermined amount;
    the means for synchronous operation timing clock slowing the synchronous operation timing clock when a remaining data amount in the means for queuing reaches a predetermined minimum.

8. The method as in claim 5, wherein the master axis motor and the slave axis motor are AC servo motors.

* * * * *